United States Patent
Ginestet et al.

(10) Patent No.: US 10,259,732 B2
(45) Date of Patent: Apr. 16, 2019

(54) SEQUENCING BATCH FACILITY AND METHOD FOR REDUCING THE NITROGEN CONTENT IN WASTE WATER

(71) Applicant: SUEZ INTERNATIONAL, Paris la Defense (FR)

(72) Inventors: Philippe Ginestet, Chateaufort (FR); Laure Graveleau Billemaz, Fresnes (FR)

(73) Assignee: SUEZ INTERNATIONAL, Paris la Defense (FR)

( * ) Notice: Subject to any disclaimer, the term of this patent is extended or adjusted under 35 U.S.C. 154(b) by 0 days.

(21) Appl. No.: 15/502,353

(22) PCT Filed: Jul. 30, 2015

(86) PCT No.: PCT/IB2015/055768
§ 371 (c)(1),
(2) Date: Feb. 7, 2017

(87) PCT Pub. No.: WO2016/020805
PCT Pub. Date: Feb. 11, 2016

(65) Prior Publication Data
US 2017/0225988 A1  Aug. 10, 2017

(30) Foreign Application Priority Data
Aug. 8, 2014 (FR) .................................. 14 57700

(51) Int. Cl.
*C02F 3/12* (2006.01)
*C02F 3/00* (2006.01)
(Continued)

(52) U.S. Cl.
CPC ............ *C02F 3/1263* (2013.01); *C02F 3/006* (2013.01); *C02F 3/20* (2013.01); *C02F 3/302* (2013.01);
(Continued)

(58) Field of Classification Search
CPC ........ C02F 3/1263; C02F 3/302; C02F 3/006; C02F 3/20; C02F 2209/42; C02F 2101/38;
(Continued)

(56) References Cited

U.S. PATENT DOCUMENTS 7,476,322 B2 * 1/2009 Dimitriou ............ B01D 61/145
  210/150
2003/0111412 A1  6/2003 Jeong et al.
(Continued)

FOREIGN PATENT DOCUMENTS

FR    2 976 937 A1   12/2012
WO   2013/041893 A1   3/2013

OTHER PUBLICATIONS

International Search Report, dated Nov. 17, 2015, from corresponding PCT application.

*Primary Examiner* — Fred Prince
(74) *Attorney, Agent, or Firm* — Young & Thompson

(57) ABSTRACT

A method for treating effluents containing nitrogen in the form of ammonium, implementing chemical reactions for oxidizing and reducing the nitrogen in a sequencing batch reactor, the method including: introducing a volume of effluents to be treated into the reactor, injecting oxygen or air into the reactor for partial oxidation of the ammonium into nitrites and/or nitrates, interrupting the injection of oxygen or air, thus producing gaseous nitrogen, depositing the sludge at the bottom of the reactor and clarifying the content of the reactor close to the surface of same, discharging a clarified fraction of the content of the reactor. The draining and feeding steps occur simultaneously. During the feeding step, the volume of effluents is introduced close to the bottom of the reactor. During the draining step, the clarified (Continued)

fraction of the content of the reactor is discharged close to the surface of the content of the reactor.

20 Claims, 2 Drawing Sheets

(51) Int. Cl.
*C02F 3/30* (2006.01)
*C02F 3/20* (2006.01)
*C02F 101/16* (2006.01)
*C02F 101/38* (2006.01)

(52) U.S. Cl.
CPC ...... *C02F 2101/16* (2013.01); *C02F 2101/38* (2013.01); *C02F 2203/006* (2013.01); *C02F 2209/001* (2013.01); *C02F 2209/10* (2013.01); *C02F 2209/14* (2013.01); *C02F 2209/15* (2013.01); *C02F 2209/34* (2013.01); *C02F 2209/42* (2013.01); *C02F 2301/024* (2013.01); *Y02W 10/15* (2015.05)

(58) Field of Classification Search
CPC ............ C02F 2101/16; C02F 2301/024; C02F 2203/006; C02F 2209/14; C02F 2209/10; C02F 2209/15
USPC ....... 210/605, 608, 609, 615, 616, 617, 630, 210/903, 260
See application file for complete search history.

(56) References Cited

U.S. PATENT DOCUMENTS

| | | |
|---|---|---|
| 2012/0261335 A1 | 10/2012 | Lemaire et al. |
| 2013/0075327 A1 | 3/2013 | Yuan et al. |
| 2014/0097136 A1 | 4/2014 | Woo et al. |
| 2014/0224729 A1 | 8/2014 | Sorensen |

* cited by examiner ties.
SEQUENCING BATCH FACILITY AND METHOD FOR REDUCING THE NITROGEN CONTENT IN WASTE WATER The invention relates to a process for the treatment of effluents containing nitrogen in the form of ammonium, using chemical oxidation and reduction reactions in a sequencing batch reactor.

A "sequencing batch" reactor refers to a reactor intended to successively treat finite quantities of liquid, as opposed in particular to a plant that treats the liquid continuously.

Such a process is known, comprising:
- a feed step, during which a volume of effluents to be treated is introduced into the reactor,
- at least one first aeration step, during which oxygen or air is injected into the reactor for an oxidation of the ammonium,
- a second anoxic step, during which, by interrupting the injection of oxygen or air, nitrogen gas is produced,
- a settling step, during which sludge is deposited at the bottom of the reactor and the content of the reactor clarifies close to the surface thereof,
- a draining step, during which a clarified fraction of the content of the reactor is evacuated, said draining step and feed step taking place simultaneously.

However, it is complicated to carry out a treatment that is both fast enough to absorb the flow of effluents or wastewaters entering a reactor and efficient enough to treat effluents and more particularly nitrogen in the form of ammonium.

The objective of the present invention is to completely or partly overcome the preceding problems via a novel treatment process.

The objective of the invention is, above all, to reduce the duration and improve the efficiency of the process for the treatment of effluents containing nitrogen in the form of ammonium.

Another objective of the invention is to improve the regulation and control of the chemical reactions for treating nitrogen in a sequencing batch reactor. Each of these two reactions requires specific conditions in order to guarantee a sufficiently complete treatment within an industrial setting where the risks of drift are high.

Another objective of the invention is to reduce the energy consumption, in particular that linked to the supply of oxygen.

Yet another objective of the invention is to reduce the amount of sludge produced during the treatment.

In addition, one objective of the invention is to reduce or even eliminate the use of external carbon for the denitrification.

According to the invention, the process for the treatment of effluents containing nitrogen in the form of ammonium, of the type defined previously, is characterized in that, during the feed step, the volume of effluents to be treated is introduced close to the bottom of the reactor, and in that, during the draining step, the clarified fraction of the content of the reactor is evacuated at a predefined evacuation level close to the surface of the content of the reactor.

Preferably, the process according to the invention makes provision to maintain the level of the content of the reactor substantially constant during the draining step and feed step.

Preferentially, during the process, it is possible to introduce the volume of effluents to be treated into the sludge bed, preferably intimately and uniformly so as to favor the homogenization of the sludge with the effluents. It is possible to introduce the volume of effluents to be treated via an injection directed toward a bottom of the reactor so as to generate turbulences in the sludge bed found at the bottom of the reactor. For example, it is possible to introduce the volume of effluents to be treated through at least one tube that is perforated with holes oriented toward the bottom of the reactor. The holes may be provided with baffles, each hole being capable of giving rise to turbulences over substantially 10 $m^2$ of the bottom of the reactor.

According to another distinctive feature of the invention, the process makes provision for the feed and draining steps to be able to be stopped when the sludge bed expands above a reference level in the reactor, the reference level being chosen at a predetermined distance below an evacuation level where the content is drawn off during the draining step. For example, an alert message is reported to supervision when the sludge bed expands above the maximum level.

Preferably, the level of the sludge bed in the reactor is detected by a suspended matter sensor placed substantially at the reference level. The suspended matter sensor detects the sludge concentration. When the detected concentration exceeds a predetermined value, the draining and feed steps are simultaneously interrupted. The sludge concentration is preferably between 1 and 10 g/l.

Preferably, according to the invention, a reactor bottom sensor detects the thickness of the sludge bed and/or detects whether this thickness exceeds a predetermined threshold, and the sludge is discharged when the thickness exceeds a predetermined threshold.

According to yet another distinctive feature of the invention, it is possible to send the content evacuated during the draining step back to the feed if the content evacuated has a suspended matter concentration substantially greater than a predetermined evacuation value.

According to yet another aspect of the invention, a plant is proposed for the treatment of effluents containing nitrogen in the form of ammonium comprising a sequencing batch reactor, a device for feeding a volume of effluents close to the bottom of the reactor, a system for recovering a clarified fraction of the content of the reactor, close to the surface of the content of the reactor, a sludge extraction system and aeration and mixing means, the reactor being arranged and equipped according to the invention for the implementation of said process.

The invention makes provision for, in addition to the arrangements set out above, a certain number of other arrangements that will be mentioned more explicitly herein below with respect to exemplary embodiments described with reference to the appended drawings, but which are in no way limiting. In these drawings.

Figure 1:
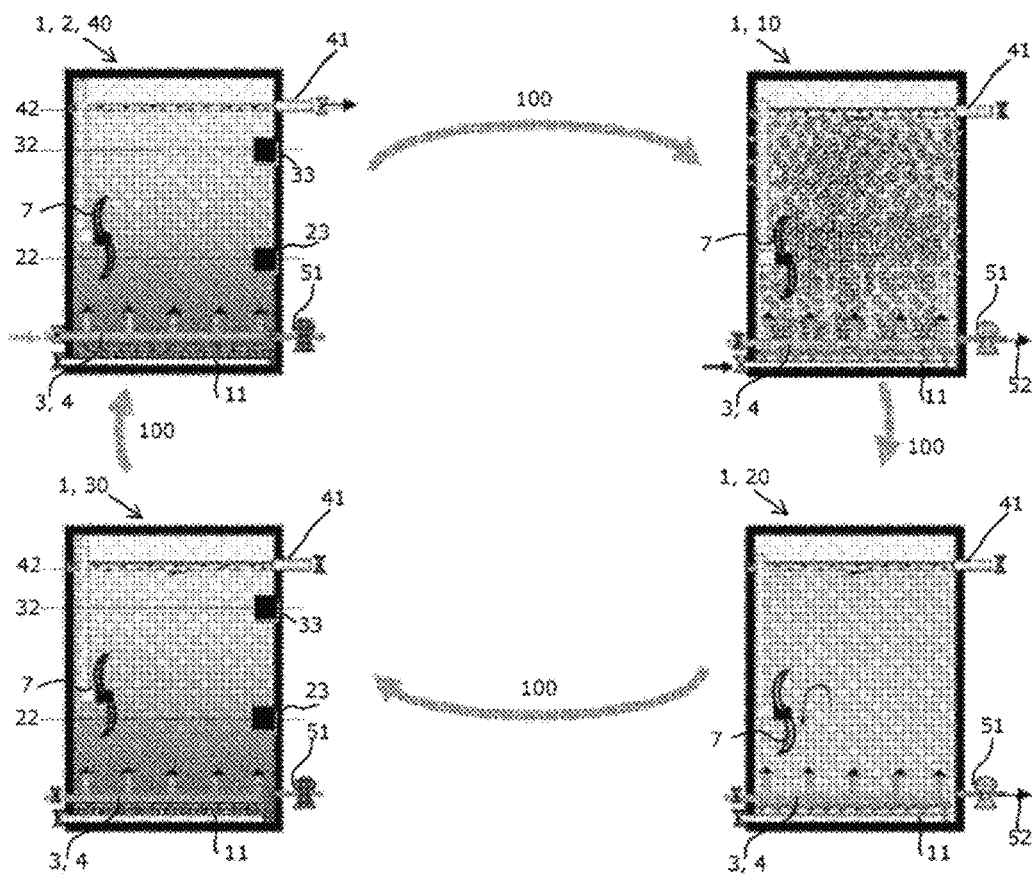
FIG. 1 shows, in schematic vertical cross section, a plant according to the invention with a sequencing batch reactor, in four views illustrating the main steps of the process.

Since these embodiments are in no way limiting, it will be possible in particular to consider variants of the invention that comprise only a selection of features described subsequently, isolated from the other features described (even if this selection is isolated within a sentence comprising these other features), if this selection of features is sufficient to confer a technical advantage or to differentiate the invention with respect to the prior art. This selection comprises at least one feature, preferably that is functional without structural details, and/or with only a portion of the structural details if this portion only is sufficient to confer a technical advantage or to differentiate the invention with respect to the prior art.

The plant (FIG. 1) for the treatment of effluents containing nitrogen in the form of ammonium comprises a sequencing batch reactor 1, for example in the form of a tank, into which effluents to be treated are introduced.

A feed device 3 for introducing the effluents to be treated into the reactor comprises a pump, the suction side of which is connected to the outside of the reactor 1 and the discharge side of which flows into a feed tube 4 that opens into the reactor 1, at a small distance above the bottom of the reactor, preferably at less than 1 m from the bottom.

A recovery system 41 for draining off a clarified fraction of the content of the reactor 1 comprises one or more inlet orifices located in the reactor 1 at a distance as small as possible below the surface of the content of the reactor 1.

Aeration means 11 are in particular formed by diffusers capable of injecting fine and/or medium bubbles into the reactor 1, which are placed in the reactor 1, preferably close to the bottom of the reactor 1, or any other oxygen supply system.

A system 51 for extracting excess sludge comprises a pump, the suction side of which is placed in the reactor 1, close to the bottom of the reactor 1. The discharge side of the pump flows into a waste pipe.

A mechanical stirring means 7 is provided in the reactor 1.

The plant comprises at least four sensors or probes inside the reactor for measuring the concentration of ammonium N-NH4, of nitrites N-NO2, of nitrates N-NO3 and of suspended matter HLB respectively.

The various sensors are connected to computing means (not represented) constituted by a computer or controller that processes the measurements in real time and makes it possible to control the running of the treatment process in automatic mode.

In this way, the reactor 1 is arranged and equipped for the implementation of an effluent treatment process according to the invention.

Figure 2:
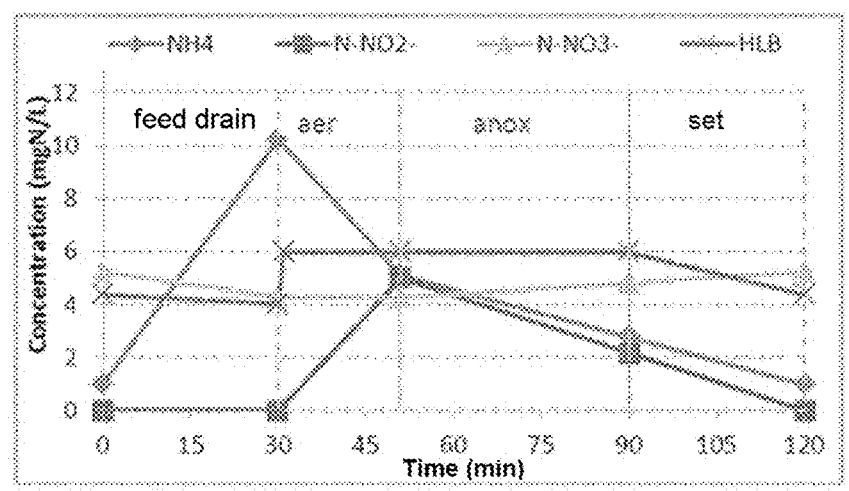
FIG. 2 is a diagram illustrating the variations in the concentrations of N-NH4, N-NO2, N-NO3 and in the concentration of sludge as a function of the time given on the x-axis, during the steps of the process.

The effluent treatment process is illustrated by FIGS. 1 and 2.

FIG. 1 illustrates a reactor 1 in four different states corresponding to different steps of the effluents treatment process. The arrows 100 indicate the direction of the sequencing of the various steps.

The diagram from FIG. 2 illustrates the concentrations of ammonium, of nitrites, of nitrates and of sludge as a function of the time and of the various steps of the process. The time in minutes (min) is given on the x-axis, whilst the concentration in milligrams per liter (mg/l) is given on the y-axis. The concentrations of ammonium, of nitrites, of nitrates and the height of the sludge bed are illustrated by curves respectively having lozenges, squares, triangles and crosses.

The effluents treatment process comprises a double feed step 2 and draining step 40 "feed drain" during which a volume of effluents containing nitrogen is introduced (increasing the concentration of NH4) and simultaneously a clarified volume is drawn off, a first aeration step 10 "aer" during which an oxidation of some of the ammonium to give nitrites (and/or nitrates) takes place, a second anoxic step 20 "anox" during which the nitrites (and/or nitrates) produced and the remaining ammonium (where appropriate) react together to produce nitrogen gas; a settling step 30 "set" during which the nitrites, nitrates and ammonium continue to be consumed, while sludge is gradually deposited at the bottom of the reactor 1.

The processes that treat the ammonium by means of the nitritation and deammonification reactions carry out two very different separate reactions, recalled hereinbelow.

Nitritation

This conversion of the ammonium to nitrites takes place in the presence of nonlimiting oxygen by nitrating bacteria (AOB), according to the equation:

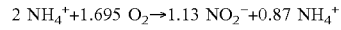

$$2\ NH_4^+ + 1.695\ O_2 \rightarrow 1.13\ NO_2^- + 0.87\ NH_4^+$$

with:
an N-NO2 produced/N-NH4 accepted ratio substantially equal to 0.565
an O2/N-NO2 produced ratio substantially equal to 3.43

Deammonification Reaction

This conversion takes place according to the equation:

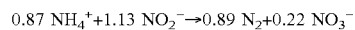

$$0.87\ NH_4^+ + 1.13\ NO_2^- \rightarrow 0.89\ N_2 + 0.22\ NO_3^-$$

with:
an N-NO2 produced/N-NH4 accepted ratio substantially equal to 0.57
an N-NO3 produced/N-NH4 accepted ratio substantially equal to 0.110
an N-N2 produced/N-NH4 accepted ratio substantially equal to 0.890.

It is observed, from the equations, that the first reaction converts the ammonium NH4 to nitrites NO2, while the second reaction combines the ammonium and the nitrites to form nitrogen gas N2 and nitrates NO3.

The yield of the first reaction depends on several elements, including:
the activity of the bacteria involved,
the presence of oxygen,
the concentration of NH4, and
the absence of inhibitor.

The yield of the second reaction depends on several elements, including:
the activity of the bacteria involved,
the conditions of the medium, in particular absence of free oxygen, sufficient alkalinity,
the concentration of the two substrates NH4 and NO2, and
the absence of inhibitor.

Regarding the concentration of the two substrates NH4 and NO2, it is necessary, on the one hand, that these substrates are at sufficient concentration and, on the other hand, that they are at a satisfactory relative concentration to enable the complete elimination thereof.

The N-NH4 concentration desired at the end of the aeration step is preferably equal to half of the initial N-NH4 concentration. Moreover, besides the importance of regulating the first aeration step 10 and the second anoxic step 20, it is noted that the supply of ammonium, i.e. of effluents, just like the activity of the bacteria, are also essential.

The objective of the invention is to establish operating rules for such a reactor, and the regulating setpoints for satisfying the treatment conditions. The regulation relates both to the feed step and to the draining step.

With reference to FIG. 1, the process for the treatment of effluents containing nitrogen in the form of ammonium, using chemical nitritation and deammonification reactions in a sequencing batch reactor, comprises a four-step sequence which is carried out cyclically:
a combined feed step 2 and draining step 40, during which a volume of effluents to be treated is introduced into the reactor 1 and simultaneously a clarified fraction of the content of the reactor 1 is evacuated, at least one first aeration step 10, during which oxygen or air is injected into the reactor 1 for a partial oxidation of the ammonium to give nitrites (and/or nitrates), a second anoxic step 20, during which, by interrupting the injection of oxygen or air, the nitrites produced and the remaining ammonium are reacted to produce nitrogen gas, a settling step 30, during which the deammonification reaction continues in the sludge bed and/or sludge is deposited at the bottom of the reactor 1 and the content of the reactor clarifies close to the surface thereof.

The operation of the reactor 1 following only four steps makes it possible to reduce the duration of the treatment process. Preferably, the four steps are very short: of the order of 20 to 30 minutes each, but may be longer or shorter (shortened) depending on the requirements. For example, the first aeration step 10 and/or the second anoxic step 20 and/or the settling step 30 may be shortened in order to increase the selection pressure on these populations capable of increasing in size to dense aggregates having a very high settleability (which may range up to "granules"). This ability makes it possible to increase the hydraulic capacity (that is to say to treat high effluent flow rates) and treatment capacity by weight of the plant and to limit the size of the plant. Furthermore, in order to facilitate the working of such a reactor, it is advantageous to operate with fixed times for each of the steps, these times being determined as a function of the treatment objectives.

In addition, the draining step 40 and feed step 2 taking place simultaneously advantageously make it possible to:

supply a small amount of organic matter in order to eliminate the nitrates (or nitrites) present in the sludge bed, select the populations that grow easily in the form of dense flocs (clusters) or even as granules, in particular the deammonifying and nitriting populations, eliminate the finest particles from the effluents and from the reaction medium by filtration through the mass of settling sludge.

Furthermore, regulating the process by the computing means makes it possible to continuously optimize the chemical nitritation and deammonification reactions and to thus make the process faster and more efficient, in particular by stopping the aeration phase exactly at the moment when the NH4/NO2 stoichiometry necessary for the deammonification is achieved.

According to the invention, during the feed step 2, the volume of effluents to be treated is introduced close to the bottom of the reactor 1, and during the draining step 40, the clarified fraction of the content of the reactor 1 is evacuated at a predefined evacuation level 42 on the surface of the content of the reactor.

Preferably, the level of the content of the reactor 1 is kept substantially constant during the draining step 40 and feed step 2. Advantageously, the recovery system 41 may remain fixed in the reactor 1.

For this, fractions of effluents to be treated are delivered, preferably successively, with the aid of the feed device 3. Similarly, clarified fractions are drained off, preferably successively, with the aid of the recovery system 41.

According to another embodiment, fractions of effluents to be treated and/or clarified fractions are respectively delivered and/or drained off in one go.

More particularly, during the feed step 2, the volume of effluents to be treated is introduced into the sludge bed, preferably intimately and uniformly so as to favor the homogenization of the sludge with the effluents.

According to one preferred embodiment, the volume of effluents to be treated is introduced via an injection directed toward a bottom of the reactor 1 so as to generate turbulences in the sludge bed found at the bottom of the reactor 1. The volume of effluents to be treated is introduced through at least one feed tube 4 that is perforated with holes oriented toward the bottom of the reactor 1.

With reference to FIG. 1, the volume of effluent to be treated is introduced, according to another preferred embodiment, through holes, oriented toward the surface of the content of the reactor, provided with baffles so that each hole respectively faces a baffle. The holes have a substantially circular shape. Preferably, each baffle has a conical shape, the apex of the cone of which is pointed toward the surface of the content of the reactor and the base of which is pointed toward a hole. In addition, each axis of revolution of a cone is respectively coincident with each axis of a hole so that each axis of a hole respectively forms, with each cone generatrix, an angle equal to a cone half-angle. During the introduction of a fraction of effluent via the holes, the liquid is deflected toward the bottom of the reactor 1 by the baffles.

Each hole is capable of giving rise to turbulences over substantially 10 $m^2$ of the bottom of the reactor 1. More generally, one to two holes may be used to give rise to turbulences over substantially 10 $m^2$ of the bottom of the reactor 1.

These arrangements have the advantages of favoring the homogenization of the sludge with the effluents and of reacting the maximum amount of effluents, that is to say nitrogen in the form of ammonium, present and/or trapped in the sludge. Thus, it is possible to reduce the amount of sludge.

According to one preferred embodiment, the draining step 40 is carried out by a recovery system 41 positioned in the reactor 1, preferably at a predefined evacuation level 42 corresponding to as small as possible a distance with the surface of the content of the reactor 1. Once the settling step 30 has been carried out, a sludge concentration gradient is observed: the bottom of the reactor 1 is filled with sludge, whereas the surface of the content of the reactor 1 has substantially clear and treated water. The recovery system 41 comprises for example a spout or a perforated tube in order to evacuate the clear and treated water.

Preferably, a surface sensor 43 is used to detect the surface of the content of the reactor. During the combined feed step 2 and draining step 40, the draining flow rate and/or the feed flow rate are regulated so as to keep a substantially constant level in the reactor 1.

The introduction of effluents toward the bottom of the reactor generates turbulences that create a moderate upward displacement of the sludge, or even a slight expansion of the sludge bed. When the sludge bed expands excessively, that is to say that the sludge concentration reaches a predetermined value at a reference level 32 in the reactor 1, the feed step 2 and draining step 40 are stopped. The reference level 32 is chosen at a predetermined distance below an evacuation level 42 where the content is drawn off during the draining step 40 (or a warning of risk of partial loss of sludge is reported). Preferably, in particular in a reactor where the evacuation level 42 is around 3 to 5 meters above the bottom of the reactor 1, the reference level 32 lies at around 50 cm below the evacuation level 42. In this way, the risk of seeing sludge infiltrate the recovery system 41 is limited.

According to one particular embodiment, the plant is sized (size and flow rate of effluents) so that the sludge bed, taking into account its settling velocity, does not expand beyond the reference level 32.

The level of the sludge bed in the reactor 1 is detected by a suspended matter level sensor 33 placed at the reference level 32 in order to warn the operator in the event of an abnormally high level of the sludge bed. The suspended matter level sensor 33 detects the sludge concentration; the sludge concentration preferably being between 1 and 5 g/l, or optionally more if the system is operating with granular sludge.

During the process, a sludge concentration is maintained in the reactor 1 for the purpose of:
- avoiding an excessive concentration that may cause an insufficient settleability of the sludge,
- avoiding an insufficient concentration that would not make it possible to guarantee sludge ages necessary for the maintenance of the nitriting and deammonifying biomass.

A reactor bottom sensor 23 detects the thickness of the sludge bed, and the sludge is discharged when the thickness exceeds a predetermined threshold 22.

The sludge concentration is maintained by means of regular extractions via a sludge extraction system 51. The sludge extraction system 51 is installed on the reactor 1 and comprises a pump and a valve. It is capable of operating during the first aeration step 10, the second anoxic step 20 (see arrows 52 in FIG. 1) and the settling step 30, and even the feed step 2 and draining step 40.

Nevertheless, in the event of excessive presence of sludge or of excessive suspended matter in the effluent discharged at the reactor outlet (in particular at the start of the feed phase), the content evacuated during the draining step 40 is sent back to the feed if the content evacuated has a sludge concentration substantially greater than a predetermined threshold, for example 5 g/l. According to another embodiment, a tertiary separation system, of surface filtration type, may be installed in the case of a very low suspended matter concentration demand of the treated water.

According to another embodiment, an effluent treatment plant is provided that comprises several reactors used in parallel. For example, when the feed step 2 and draining step 40 take place in one reactor, the others may be in the process of carrying out, for one, the settling step 30, for the other the first aeration step 10 and for yet another the second anoxic step 20. Preferably, the effluent treatment plant comprises four reactors. In this way, it is possible to treat high flow rates of incoming effluents. The process may be adapted to a larger or smaller number of reactors.

In the event of the shutdown of a reactor for any problem, the process is accelerated, which makes it possible to continue the treatment of the effluents with a slight alteration of the efficiency when the nitrogen concentration is maximal.

According to yet another embodiment, the process uses chemical reactions that produce nitrates in a small amount (around 10% of the nitrogen of the raw water, i.e. 3 to 10 mg N-NO3-/l in general). If the presence of nitrates in the treated water is judged to be excessive, provision is made to recirculate nitrates to the inlet of the reactor (when the hydraulic flow rate enables it or else by having taken into account this recirculation in the hydraulic design of the plant). Alternatively, provision is made to recirculate nitrates upstream of the reactor 1.

In addition, at least one pretreatment step of the suspended matters and of the soluble organic matter is provided, for example "under anoxic conditions", upstream of the reactor 1. According to yet another embodiment, provision is made to recirculate nitrates before this pretreatment step.

Depending on the desired yield, the recirculation of nitrates may be adjusted (100% recirculation on average for 50% elimination of the nitrates for example).

Of course, the invention is not limited to the examples which have just been described and numerous adjustments may be made to these examples without departing from the scope of the invention.

For example, the invention may relate to any effluent containing ammonium (or reduced nitrogen).

Of course, the various features, forms, variants and embodiments of the invention may be combined with one another according to various combinations as long as they are not incompatible or exclusive of one another. In particular, all the variants and embodiments described above can be combined with one another.

The invention claimed is:

1. A process for the treatment of effluents containing nitrogen in the form of ammonium, using chemical oxidation and reduction reactions in a sequencing batch reactor (1), the process comprising:
   a feed step (2), during which a volume of effluents to be treated is introduced into the reactor (1),
   at least one first aeration step (10), during which oxygen or air is injected into the reactor (1) for a partial oxidation of the ammonium to give nitrites and/or nitrates,
   a second anoxic step (20), during which, by interrupting the injection of oxygen or air, nitrogen gas is produced,
   a settling step (30), during which sludge is deposited at the bottom of the reactor (1) to form a sludge bed, and content of the reactor clarifies at the surface thereof,
   a draining step (40), during which a clarified fraction of the content of the reactor is evacuated,
   said draining step (40) and feed step (2) taking place simultaneously,
   wherein during the feed step (2), the volume of effluents to be treated is introduced at less than 1 m from the bottom of the reactor (1),
   wherein during the draining step (40), the clarified fraction of the content of the reactor is evacuated at a predefined evacuation level (42) at the surface of the content of the reactor,
   and wherein the level of the content of the reactor is kept substantially constant during the draining step (40) and feed step (2).

2. The process according to claim 1, wherein the volume of effluents to be treated is introduced into the sludge bed.

3. The process according to claim 1, wherein the volume of effluents to be treated is introduced via an injection directed toward a bottom of the reactor (1) so as to generate turbulences in the sludge bed found at the bottom of the reactor (1).

4. The process according to claim 1, wherein the volume of effluents to be treated is introduced through at least one feed tube (4) that is perforated with holes oriented toward the bottom of the reactor.

5. The process according to claim 4, wherein said holes are provided with baffles, each hole being capable of giving rise to turbulences over substantially 10 m$^2$ of the bottom of the reactor (1).

6. The process according to claim 1, wherein the feed step (2) and draining step (40) are stopped when the sludge bed expands above a reference level (32) in the reactor (1), the reference level (32) being chosen at a predetermined distance below an evacuation level (42) where the content is drawn off during the draining step (40).

7. The process according to claim 6, wherein the level of the sludge bed in the reactor (1) is detected by a suspended matter sensor placed at the reference level (32).

8. The process according to claim 7, wherein the suspended matter sensor detects the sludge concentration, the sludge concentration being between 1 and 10 g/l.

9. The process according to claim 1, wherein a reactor bottom sensor detects the thickness of the sludge bed, and the sludge is discharged when the thickness exceeds a predetermined threshold.

10. The process according to claim 1, wherein the content evacuated during the draining step (40) is sent back to the feed step (2) if the content evacuated has a sludge concentration substantially greater than a predetermined value.

11. A plant for the treatment of effluents containing nitrogen in the form of ammonium, comprising a sequencing batch reactor (1), a device (3) for feeding a volume of effluents at less than 1 m from the bottom of the reactor (1), a reference level (32) defining a distance 50 cm below a level at which the surface of a content is to be located in the reactor (1), a system (41) for recovering a clarified fraction of the content fed to the reactor, said system (41) comprising a perforated tube comprising one or more inlet orifices located in the reactor (1) between the reference level (32) and the level at which the surface of the content is to be located in the reactor (1), a sludge extraction system (51) and aeration means (11),
the reactor (1) being arranged and equipped for the implementation of a process according to claim 1.

12. The process of claim 2, wherein the volume of effluents is introduced into the sludge bed intimately and uniformly so as to favor the homogenization of the sludge with the effluents.

13. The process according to claim 2, wherein the volume of effluents to be treated is introduced via an injection directed toward a bottom of the reactor (1) so as to generate turbulences in the sludge bed found at the bottom of the reactor (1).

14. The process according to claim 2, wherein the volume of effluents to be treated is introduced through at least one feed tube (4) that is perforated with holes oriented toward the bottom of the reactor.

15. The process according to claim 3, wherein the volume of effluents to be treated is introduced through at least one feed tube (4) that is perforated with holes oriented toward the bottom of the reactor.

16. The process according to claim 2, wherein the feed step (2) and draining step (40) are stopped when the sludge bed expands above a reference level (32) in the reactor (1), the reference level (32) being chosen at a predetermined distance below an evacuation level (42) where the content is drawn off during the draining step (40).

17. The process according to claim 3, wherein the feed step (2) and draining step (40) are stopped when the sludge bed expands above a reference level (32) in the reactor (1), the reference level (32) being chosen at a predetermined distance below an evacuation level (42) where the content is drawn off during the draining step (40).

18. The process according to claim 4, wherein the feed step (2) and draining step (40) are stopped when the sludge bed expands above a reference level (32) in the reactor (1), the reference level (32) being chosen at a predetermined distance below an evacuation level (42) where the content is drawn off during the draining step (40).

19. The process according to claim 5, wherein the feed step (2) and draining step (40) are stopped when the sludge bed expands above a reference level (32) in the reactor (1), the reference level (32) being chosen at a predetermined distance below an evacuation level (42) where the content is drawn off during the draining step (40).

20. The process of claim 8, wherein the sludge concentration is between 1 and 10 g/l.

* * * * *